(12) United States Patent
Sterioff et al.

(10) Patent No.: US 11,288,114 B2
(45) Date of Patent: Mar. 29, 2022

(54) REMOTE DIAGNOSTIC OF COMPUTING DEVICES

(71) Applicant: Microsoft Technology Licensing, LLC, Redmond, WA (US)

(72) Inventors: Michelle Sterioff, Kirkland, WA (US); Devin Sinha, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 236 days.

(21) Appl. No.: 16/258,570

(22) Filed: Jan. 26, 2019

(65) Prior Publication Data
US 2020/0241945 A1 Jul. 30, 2020

(51) Int. Cl.
| | |
|---|---|
| *G06F 11/00* | (2006.01) |
| *G06F 11/07* | (2006.01) |
| *G06F 11/22* | (2006.01) |
| *G06F 11/30* | (2006.01) |
| *G06F 21/62* | (2013.01) |

(52) U.S. Cl.
CPC ........ *G06F 11/079* (2013.01); *G06F 11/0793* (2013.01); *G06F 11/2294* (2013.01); *G06F 11/3072* (2013.01); *G06F 21/6245* (2013.01)

(58) Field of Classification Search
CPC .. G06F 11/008; G06F 11/079; G06F 11/3409; G06F 11/3452; G06F 11/3604; G06F 11/0793; G06F 11/2294; G06F 11/3072; G06F 11/0751; G06F 11/0787; G06F 11/0709; G06F 21/6245
USPC ........................................ 714/1-57
See application file for complete search history.

(56) References Cited

U.S. PATENT DOCUMENTS

| | | |
|---|---|---|
| 10,108,477 B2 | 10/2018 | Kanodia |
| 2005/0097405 A1 | 5/2005 | Sesek et al. |
| 2005/0125555 A1 * | 6/2005 | Patel ...................... H04L 69/40 709/238 |

(Continued)

FOREIGN PATENT DOCUMENTS

| | | | |
|---|---|---|---|
| EP | 2778924 A1 * | 9/2014 | ............. H04L 41/00 |
| EP | 2778924 A1 | 9/2014 | |

OTHER PUBLICATIONS

"International Search Report and Written Opinion issued in PCT Application No. PCT/US2020/012290", dated May 4, 2020, 13 Pages.

(Continued)

*Primary Examiner* — Sarai E Butler
(74) *Attorney, Agent, or Firm* — Liang IP, PLLC

(57) ABSTRACT

Techniques for performing remote diagnostics in computing systems are disclosed herein. In one implementation, a first computing device can transmit to a remote server, data reporting an operational issue related to a second computing device. The remote server can then transmit a diagnostic command to the second computing device via the computer network. The second computing device can then execute the diagnostic command to generate diagnostic information. Upon receiving the generated diagnostic information from the second computing device, the remote server can combine the data from the first computing device reporting the operational issue with the generated diagnostic information from the second computing device and store the combined data as a database record corresponding to the reported operational issue.

20 Claims, 8 Drawing Sheets

(56) References Cited

U.S. PATENT DOCUMENTS

| | | | |
|---|---|---|---|
| 2005/0216784 A1* | 9/2005 | Srinivasan | G06Q 10/00 714/4.2 |
| 2010/0180160 A1* | 7/2010 | Kuo | G06F 11/0748 714/46 |
| 2010/0229112 A1* | 9/2010 | Ergan | G06F 11/0748 715/764 |
| 2012/0079100 A1 | 3/2012 | Mcintyre et al. | |
| 2014/0059388 A1* | 2/2014 | Patiev | G06F 11/0781 714/37 |
| 2014/0101232 A1 | 4/2014 | Harhi | |
| 2014/0223230 A1* | 8/2014 | Schechter | G06F 11/0709 714/18 |
| 2015/0149815 A1* | 5/2015 | Maity | G06F 11/0706 714/5.11 |
| 2015/0200933 A1* | 7/2015 | Charette | H04L 63/0815 726/8 |
| 2015/0293799 A1* | 10/2015 | Sekine | G06F 11/0709 714/37 |
| 2016/0092310 A1 | 3/2016 | Peacock et al. | |
| 2016/0224532 A1* | 8/2016 | Miller | G06F 16/22 |
| 2016/0371661 A1* | 12/2016 | Shah | G06Q 20/401 |
| 2017/0104807 A1* | 4/2017 | Braun | H04L 67/125 |
| 2018/0239659 A1 | 8/2018 | Nallabothula et al. | |
| 2018/0336087 A1 | 11/2018 | Bradley et al. | |
| 2018/0365092 A1* | 12/2018 | Linetskiy | G06F 11/0757 |
| 2019/0182113 A1* | 6/2019 | Alam | H04L 43/16 |

OTHER PUBLICATIONS

"Remotely Managing Devices", Retrieved from <<https://www.novell.com/documentation/zcm10/zcm10_quickstart/data/ba8fpw2.html>>. Retrieved on: Nov. 22, 2018, 7 Pages.

"Run remote diagnostics", Retrieved from <<https://support.google.com/meethardware/answer/6386674?hl=en>>, Retrieved on: Nov. 22, 2018, 3 Pages.

Eiden, Jeff, "Introducing Remote Diagnostics: Monitor the Health of Your Devices Wirelessly", Retrieved from <<https://blog.particle.io/2018/06/05/introducing-remote-diagnostics-monitor-the-health-of-your-devices-wirelessly/>>, Jun. 5, 2018, 7 Pages.

Application as Filed in U.S. Appl. No. 16/179,360, filed Nov. 2, 2018, 26 Pages.

* cited by examiner

REMOTE DIAGNOSTIC OF COMPUTING DEVICES

BACKGROUND

Diagnostics of computing devices typically involve determining operational status or state of software, hardware, firmware, or other types components of computing devices. Diagnostic programs can often facilitate performance of diagnostics of computing devices. For example, during normal start-up of a desktop computer, a basic input/output system ("BIOS") embedded power-on self-test ("POST") program can be automatically executed to validate integrity of hardware components in the desktop computer before allowing deployment of an operating system. In another example, a diagnostic program can also be executed on-demand to determine a root cause when, for instance, the computing device has malfunctioned.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Though diagnostic programs can provide diagnostic information useful for resolving operational issues of computing devices, submitting diagnostic information and corresponding description may sometimes be cumbersome and inefficient. For example, a user may have multiple computing devices, such as a smartphone, a laptop, a desktop, a gaming console, a smart television, etc. When the user experiences an issue on, for instance, the gaming console, a diagnostic program on the gaming console can be executed by the user to generate diagnostic information. Resulting diagnostic information can then be submitted to technical support or other suitable entities for troubleshooting. However, typing a description or feedback of the experienced operational issue using a soft keyboard on the gaming console can be cumbersome and inefficient. Also, in certain circumstances, the user may not have access to the gaming console when composing the description or feedback. Thus, even though the user can readily type the feedback on, for instance, the laptop and submit the feedback to technical support from the laptop, the user may not submit the diagnostic information of the gaming console from the laptop. As such, the foregoing difficulties in submitting the feedback and diagnostic information may discourage the user from submitting anything at all. The lack of submitted diagnostic information may cause delay of bugfixes or other suitable remedies to the experienced operational issue, and thus can negatively impact user experience of the computing devices.

Several embodiments of the disclosed technology is directed to implementing a diagnostic system on a remote server to allow user initiated diagnostic information collection from a computing device by using a different computing device. In certain embodiments, the diagnostic system can include a software application that is configured to allow a user to register multiple computing devices corresponding to a user account. As such, in the example above, the user can register one or more of the smartphone, laptop, desktop, gaming console, and smart television using a user account.

The user can then initiate a feedback process regarding one of the registered computing devices by using another one of the registered computing devices. For instance, in the example above, the user can log into the user account with suitable credentials via the laptop. In response, the diagnostic system can be configured to transmit and render all registered computing devices on a user interface at the laptop upon authenticating the user based on the credentials. The diagnostic system can then be configured to provide an option for the user to select one of the registered computing devices, for instance, the gaming console, for providing feedback. For instance, the diagnostic system can be configured to provide an input field for receiving text of a description or feedback of an operation issue of the gaming console from the user. The user can use the user interface on the laptop to compose the description and then transmit the description in a feedback package related to the gaming console to the diagnostic system at the remote server via a computer network (e.g., the Internet).

In certain implementations, the feedback package can include data representing a user identification (e.g., a user login name, a user email, etc.), the description received in the input field from the user, and a device identification (e.g., a serial number of the gaming console). In other implementations, the feedback package can also include data representing credentials for remote access to the gaming console, such as passwords, passcodes, etc. In further implementations, the user can provide such credentials and/or other suitable device information during device registration or other suitable times. Data representing such device information can then be stored on the remote server or other suitable storage locations to be accessible by the diagnostic system.

Upon receiving the feedback package, the diagnostic system can be configured to parse the feedback package and determine that the feedback package received from the laptop is actually directed to the gaming console. In response, the diagnostic system can be configured to issue a remote command to the gaming console for executing one or more diagnostic programs on the gaming console. In certain implementations, the diagnostic system can be configured to analyze the submitted description and/or other suitable information to determine which areas or components of the gaming console are to be tested. For example, when the description indicates that the gaming console fails to boot, the diagnostic system can be configured to test one or more of a BIOS, an operating system, a power supply, or other suitable hardware/software components of the gaming console. In another example, when the description indicates that the gaming console has no network connection, the diagnostic system can be configured to test one or more of a network interface card ("NIC"), a NIC driver, and/or other suitable network components of the gaming console.

Upon completion of executing the diagnostic programs on the gaming console, the diagnostic system can be configured to retrieve or otherwise receive suitable diagnostic information generated during execution of the diagnostic programs from the gaming console. The diagnostic system can then be configured to combine or aggregate the received description from the laptop and the diagnostic information from the gaming console into a database record (referred to herein as a "diagnostic record"). In some embodiments, the diagnostic system can also receive metadata about the user, the various computing devices, and/or the time feedback was filed and join such metadata with the diagnostic information from the gaming console. The diagnostic system can then store the diagnostic record with data representing the combined description and diagnostic information in a database for further processing, record keeping, and/or other suitable purposes.

In certain embodiments, the diagnostic system can also configure or program the gaming console for additional diagnostic and/or other related information. For example, the diagnostic system can be configured to program the gaming console to prompt the user for additional diagnostic information, screen shots, or other suitable data when the user subsequently accesses the gaming console. In other embodiments, the diagnostic system can also be configured to analyze the description in combination with the retrieved diagnostic information to determine a root cause of the reported issue with the gaming console and automatically apply a remedial action to the gaming console. For example, the diagnostic system can be configured to analyze the feedback and diagnostic information and determine that the operating system on the gaming console has crashed. In response, the diagnostic system can be configured to issue a reboot command that causes the gaming console to restart. In another example, the diagnostic system can be configured to determine that the network interface card has failed on the gaming console. In response, the diagnostic system can be configured to provide a message to the user for replacement of the network interface card on the gaming console.

Several embodiments of the disclosed technology can thus allow efficient submission of feedbacks from a first computing device while allowing remote diagnostic information collection from a second computing device. Unlike other diagnostic systems, user feedback regarding issues of the second computing device can be submitted using the first computing device. The first computing device may include hardware/software components that facilitate ready input from the user, for instance, via typing, voice recognition, or other suitable input techniques. Upon receiving the user feedback from the first computing device, the diagnostic system at the remote server can trigger remote collection of diagnostic information of the second computing device. The collected diagnostic information from the second computing device can then be aggregated or "aligned" with the received feedback from the first computing device as a diagnostic record for the reported issue of the second computing device. As such, technical issues on the second computing device can be readily submitted, diagnosed, and/or remedied even when the user has no physical access to the second computing device.

DETAILED DESCRIPTION

Figure 1A:
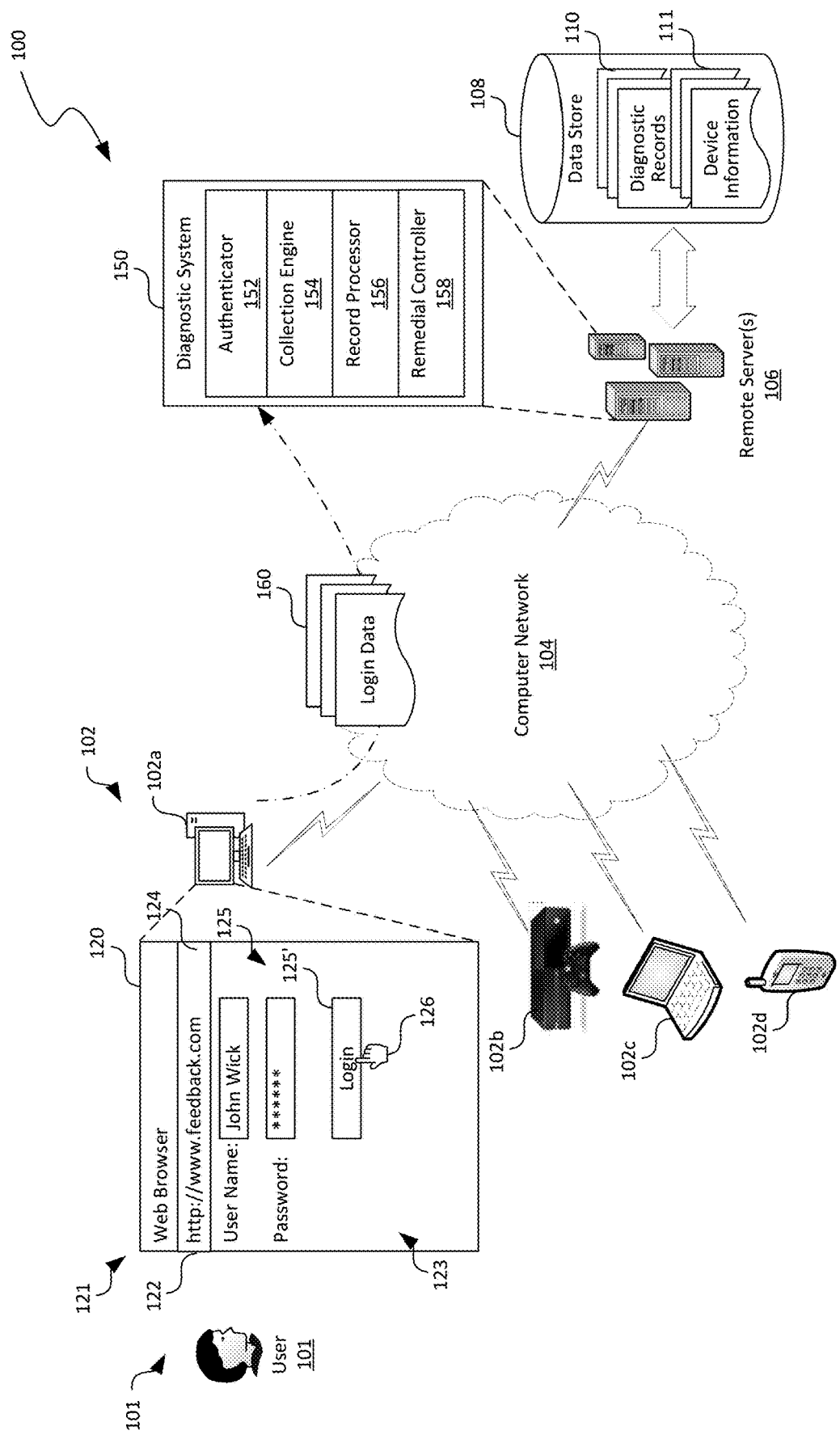
FIGS. 1A-1E are schematic diagrams of a computing system implementing remote diagnostic of computing devices in a distributed computing system during certain stages of operations in accordance with embodiments of the disclosed technology.

Certain embodiments of computing systems, devices, components, modules, routines, and processes for remote diagnostic of computing devices in computing systems are described below. In the following description, specific details of components are included to provide a thorough understanding of certain embodiments of the disclosed technology. A person skilled in the relevant art can also understand that the disclosed technology may have additional embodiments or may be practiced without several of the details of the embodiments described below with reference to FIGS. 1A-5.

As used herein, "diagnostic" generally refers to a practice or technique of determining a current status or state of a hardware/software component of a computing device. A "diagnostic command" generally refers to a computing command that is configured to trigger execution of a diagnostic program on a computing device. For example, a diagnostic command can be a file name (or a portion thereof) of a corresponding diagnostic program. A diagnostic program can be configured to perform a sequence of operations that test functionalities of hardware/software components of a computing device. One example diagnostic program is a BIOS embedded power-on self-test program. Execution of a diagnostic program can generate diagnostic information having data representing a current status or state of a hardware/software component of a computing device.

Submitting diagnostic information with corresponding description from certain computing devices may be cumbersome and inefficient. For example, typing a description or feedback of an operational issue using a soft keyboard on a gaming console can be cumbersome and inefficient. Also, in certain circumstances, the user may not have access to the gaming console when composing the description or feedback. Thus, even though the user can readily type the feedback on, for instance, a laptop, the user may not submit any diagnostic information of the gaming console from the laptop. As such, submitting the feedback and diagnostic information may be difficult. Such difficulties may discourage the user from submitting anything at all. The lack of submitted diagnostic information may cause delay of bug-fixes or other suitable remedies to the experienced operational issue, and thus can negatively impact user experience of the computing devices.

Several embodiments of the disclosed technology is directed to implementing a diagnostic system on a remote server to allow user initiated diagnostic information collection from a computing device by using a different computing device. In certain embodiments, the diagnostic system can allow a user to select a computing device from multiple registered computing devices and provide a description or feedback of an operating issue on a different computing device. The diagnostic system on the remote server can then be configured to remotely trigger execution of diagnostic programs on and receive diagnostic information the selected computing device. The diagnostic system can then combine or align the received diagnostic information from the selected computing device and the description from the other computing device into a diagnostic record useful for further processing. As such, a user can efficiently and readily submit feedback of operational issues of the selected computing device from the other computing device, as described in more detail below with reference to FIGS. 1A-5.

FIGS. 1A-1E are schematic diagrams of a computing system implementing remote diagnostic of computing devices in a distributed computing system during certain stages of operations in accordance with embodiments of the disclosed technology. In FIG. 1A-1E and in other Figures herein, individual software components, objects, classes, modules, and routines may be a computer program, procedure, or process written as source code in C, C++, C#, Java, and/or other suitable programming languages. A component may include, without limitation, one or more modules, objects, classes, routines, properties, processes, threads, executables, libraries, or other components. Components may be in source or binary form. Components may include aspects of source code before compilation (e.g., classes, properties, procedures, routines), compiled binary units (e.g., libraries, executables), or artifacts instantiated and used at runtime (e.g., objects, processes, threads). In certain embodiments, the various components and modules described below can be implemented with actors. In other embodiments, generation of the application and/or related services can also be implemented using monolithic applications, multi-tiered applications, or other suitable components.

Components within a system can take different forms within the system. As one example, a system comprising a first component, a second component and a third component can, without limitation, encompass a system that has the first component being a property in source code, the second component being a binary compiled library, and the third component being a thread created at runtime. The computer program, procedure, or process may be compiled into object, intermediate, or machine code and presented for execution by one or more processors of a personal computer, a network server, a laptop computer, a smartphone, and/or other suitable computing devices. Equally, components may include hardware circuitry.

A person of ordinary skill in the art would recognize that hardware may be considered fossilized software, and software may be considered liquefied hardware. As just one example, software instructions in a component may be burned to a Programmable Logic Array circuit or may be designed as a hardware circuit with appropriate integrated circuits. Equally, hardware may be emulated by software. Various implementations of source, intermediate, and/or object code and associated data may be stored in a computer memory that includes read-only memory, random-access memory, magnetic disk storage media, optical storage media, flash memory devices, and/or other suitable computer readable storage media excluding propagated signals.

As shown in FIG. 1A, the distributed computing system 100 can include a computer network 104 interconnecting a plurality of client devices 102 (shown as first, second, third, and fourth client devices 102a-102d, respectively) of a corresponding user 101, and one or more remote servers (referred to herein as "remote server 106" for brevity) interconnected to a data store 108. Even though particular components of the distributed computing system 100 are shown in FIG. 1A, in other embodiments, the distributed computing system 100 can also include additional and/or different constituents. For example, the distributed computing system 100 can include additional network storage devices, utility infrastructures, and/or other suitable components in addition to or in lieu of those shown in FIG. 1A.

The computer network 104 can include an intranet, a wide area network, the Internet, or other suitable types of network. In certain implementations, the computer network 104 can include one or more physical network devices that interconnect the client devices 102 and the remote servers 106. Examples of such physical network devices can include network routers, switches, firewalls, load balancers, or other suitable network components operatively coupled in a hierarchical, flat, "mesh," or other suitable topologies. In other embodiments, the computer network 104 can include the Internet.

The remote server 106 can be configured to host and provide access of the diagnostic system 150 (described later) to the user 101 and other users (not shown) via the computer network 104. In certain embodiments, the remote server 106 can include one or more physical servers located in a datacenter. In other embodiments, the remote server 106 can include one or more virtual machines, containers, or other suitable virtualized computing components hosted on one or more physical servers. In further embodiments, the remote server 106 can include other suitable types of computing facilities.

The client devices 102 can each include a computing device that facilitates the user 101 to access the diagnostic system 150 hosted on and provided by the remote server 106 via the computer network 104. For example, in the illustrated embodiment, the client devices 102 include a desktop computer 102a, a gaming console 102b, a laptop computer 102c, and a smartphone 102d. In other embodiments, the client devices 102 can also include smart televisions, tablet computers, and/or other suitable computing devices. Even though only one user 101 is shown in FIG. 1A for illustration purposes, in other embodiments, the distributed computing system 100 can facilitate any suitable number of users 101 to access the diagnostic system 150 provided by the servers 106.

In certain embodiments, the user 101 can register the client devices 102 as corresponding to a user account at the diagnostic system 150. For example, the user 101 can create a user account at the diagnostic system 150 and add the individual client devices 102 as client devices 102 of the user 101. In other examples, the client devices 102 can be registered to the user 101 when, for instance, the user 101 activates the client devices with the user account. In further examples, the user 101 may not register one or more of the client devices 102, and instead provide access to the one or more client devices 102 for remote collection of diagnostic information on an ad hoc basis, as described in more detail below.

One or more of the client devices 102 can be configured to provide a user interface 120 that readily facilitates user input of a description or feedback of an operational issue related to another client device 102. For example, as shown in FIG. 1A, the first client device 102a (e.g., the desktop computer) can execute suitable instructions to provide a web browser 120 that is configured to provide a webpage 121 as a user interface for receiving a description or feedback of another client device 102 to the user 101. In the illustrated example, the webpage 121 can include an address bar 122 containing a web address (e.g., "www.feedback.com") and a body section 123 containing content of the webpage 121. In the illustrated implementations, the webpage 121 can provide a login page to the user 101. The login page can include input fields 125 for user name (e.g., "John Wick") and a password (e.g., "*****"), and a login button 125'. Upon receiving an actuation of the login button 125' (as represented by the cursor 126), the first client device 102a can be configured to transmit the received login data 160 to the diagnostic system 150 for further processing.

As shown in FIG. 1A, the diagnostic system 150 can include an authenticator 152, a collection engine 154, a record processor 156, and an optional remedial controller 158 operatively coupled to one another. Even though particular components of the diagnostic system 150 are shown in FIG. 1A, in other embodiments, the diagnostic system 150 can also include interface, input/output, web service, and/or other suitable types of components in addition to or in lieu of those shown in FIG. 1A. In further embodiments, one or more of the components shown in FIG. 1A may be hosted on other servers (not shown) instead of the remote server 106. For example, in certain implementations, the remedial controller 158 may be hosted on and provided by a remedial server (not shown) in lieu of the remote server 106.

The authenticator 152 can be configured to authenticate the user 101 as corresponding to a user account based on the received login data 160. Upon authenticating the user 101, the authenticator 152 can allow other components of the diagnostic system 150 to provide additional services to the user 101. In the illustrated embodiment, the authenticator 152 is configured to authenticate the user 101 based on the received password from the user 101. In other embodiments, the authenticator 152 can also be configured to authenticate the user 101 using multi-operation authentication techniques or other suitable techniques. In further embodiments, the authenticator 152 may be omitted from the diagnostic system 150 but instead hosted on or provided by an authentication server or service, such as the Active Directory® service provided by Microsoft Corporation of Redmond, Wash.

Figure 1B:
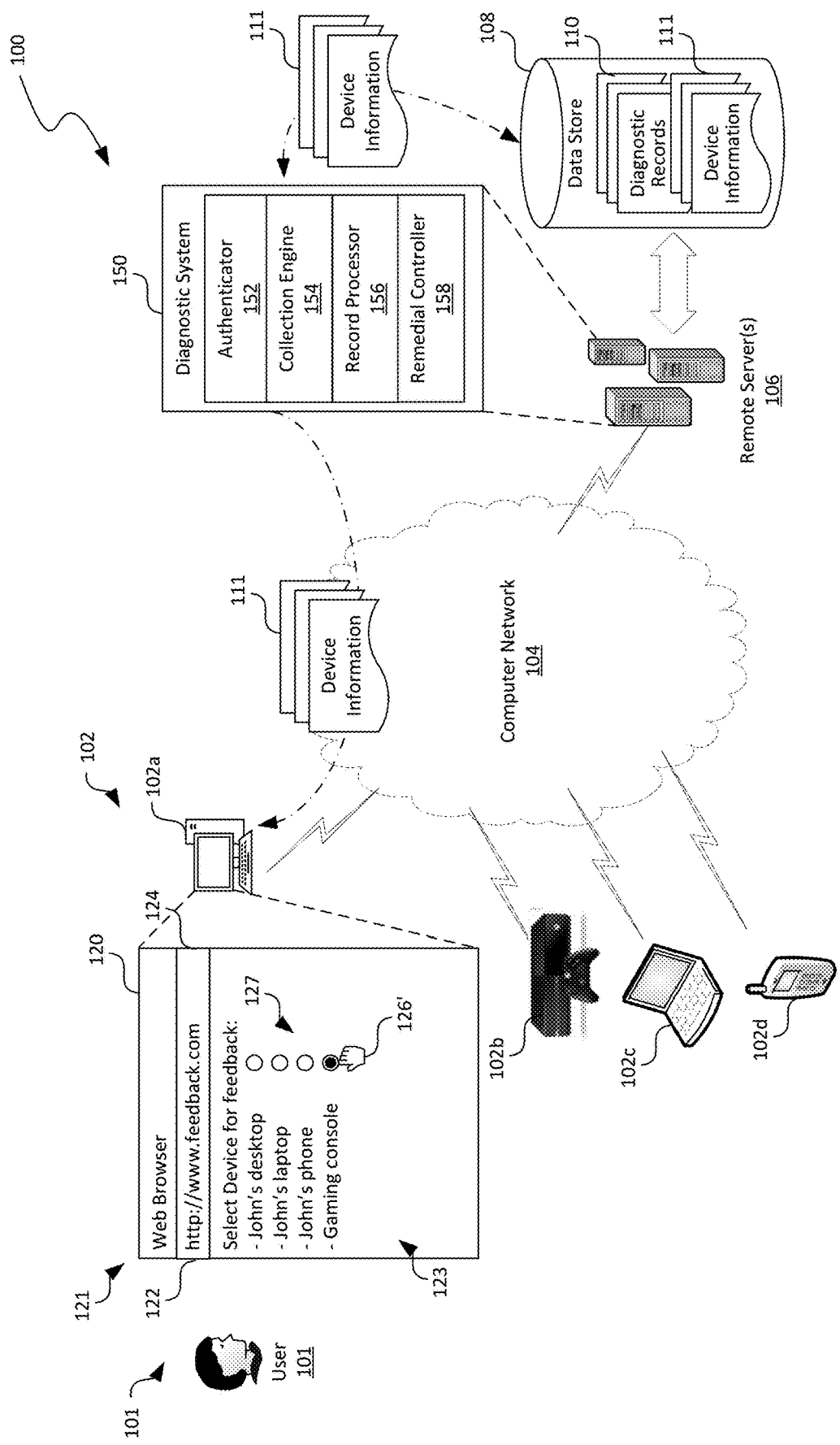

Upon authenticating the user 101, in certain embodiments, the authenticator 152 can indicate to the collection engine 154 that the user 101 has been authenticated into a corresponding user account. In response, the collection engine 154 can be configured to retrieve suitable device information 111 from the data store 108. In certain embodiments, the device information 111 can include data representing a list of client devices 102 that have been registered to the user account. The collection engine 154 can then transmit the list of client devices 102 to the first client device 102a for surfacing to the user 101. For instance, as shown in FIG. 1B, the webpage 121 can output the list of client devices 102 as "John's desktop," "John's laptop," "John's phone," and "Gaming console." The webpage 121 can also provide interface elements, such as selection buttons 127 shown in FIG. 1B, for selecting one or more of the listed client devices 102 for providing feedback. In the illustrated example, the "Gaming console" is selected (as represented by the cursor 126'). In other embodiments, the collection engine 154 can be configured to query the user 101 for identifying one of the client devices 102 (e.g., the second client device 102b) for providing feedback.

Figure 1C:
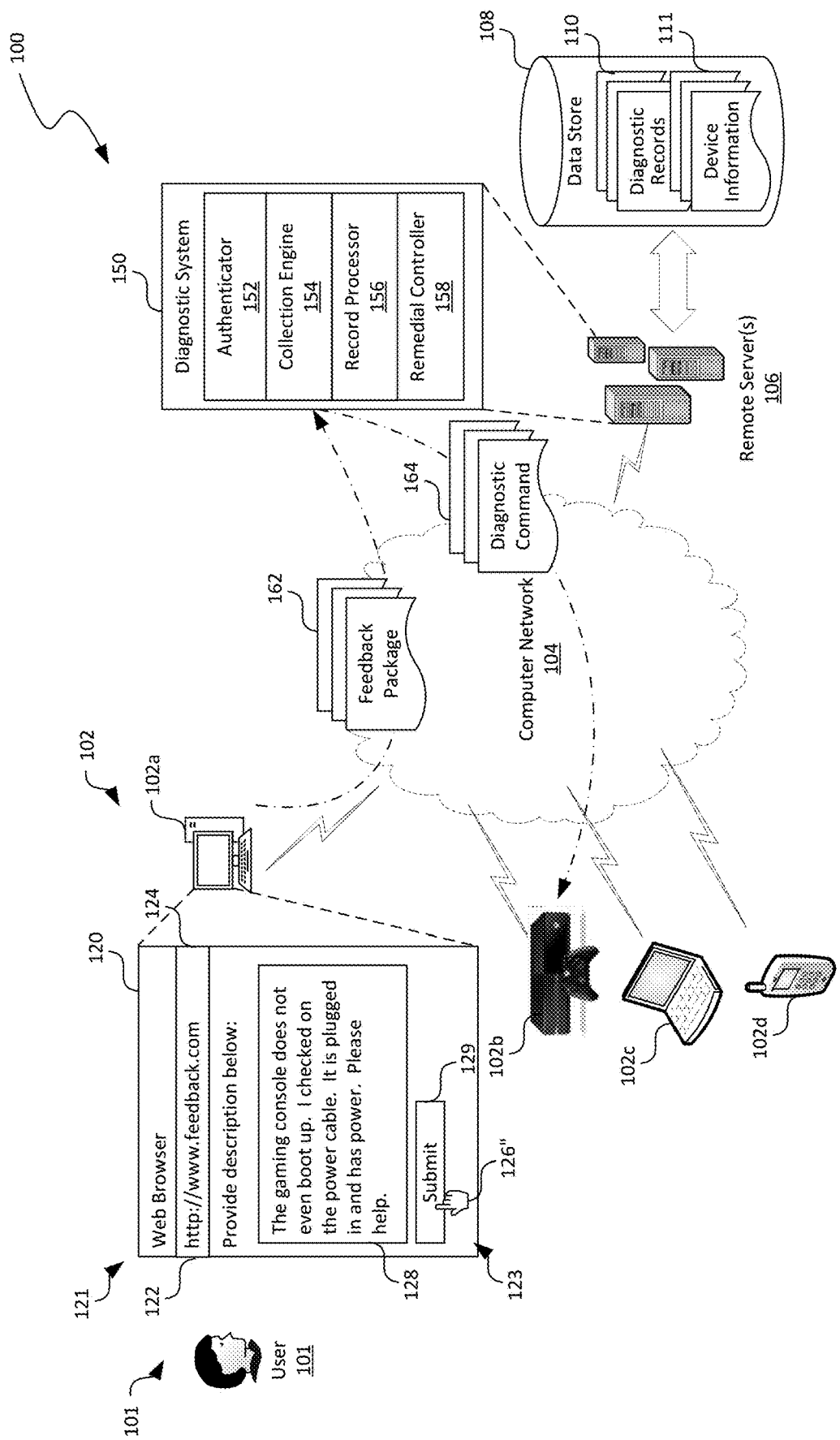

As shown in FIG. 1C, upon receiving the user selection of the "Gaming console" on the webpage 121, the webpage 121 can be configured to provide another input field 128 for receiving a description or feedback of one or more operational issues with the selected client device. In the illustrated example, the second client device 102b, i.e., the "Gaming console" is selected. As such, the user 101 can then type or otherwise enter into the input field 128 a brief description, i.e., "The gaming console does not even boot up. I checked on the power cable. It is plugged in and has power. Please help." Upon completion of entering the description, the user 101 can actuate the submit button 129 (as represented by the cursor 126") to transmit a feedback package 162 to the collection engine 154 via the computer network 104.

In certain implementations, the feedback package 162 can include data representing a user identification (e.g., a user login name, a user email, etc.) of the user 101, the description received in the input field 128 from the user 101, and a device identification (e.g., a serial number of the "Gaming console"). In other implementations, the feedback package 162 can also include data representing credentials for remote access to the selected client device 102d, such as passwords, passcodes, etc. In further implementations, the user 101 can provide such credentials and/or other suitable device information during device registration or other suitable times. Data representing such device information can then be stored on the remote server 106, in the data store 108, or other suitable storage locations to be accessible by the diagnostic system 150.

Upon receiving the feedback package 162, the collection engine 154 can be configured to parse the feedback package 162 and determine that the feedback package 162 received from the first client device 102a (i.e., the desktop computer) is directed to the second client device 102b (i.e., the gaming console). Such determination can be based on device identification, the description, or other suitable information included in the feedback package 162. In response, the collection engine 154 can be configured to issue a diagnostic command 164 to the second client device 102b for executing one or more diagnostic programs thereon.

In certain implementations, the collection engine 154 can be configured to analyze the submitted description and/or other suitable information in the feedback package 162 to determine which areas or components of the second client device 102b are to be tested. In the illustrated example, the description indicates that the gaming console fails to boot. As such, the collection engine 154 can be configured to issue the diagnostic command 164 to test one or more of a BIOS, an operating system, a power supply, or other suitable hardware/software components of the gaming console. In another example, when the description indicates that the gaming console has no network connection, the collection engine 154 can be configured to issue the diagnostic command 164 to test one or more of a network interface card ("NIC"), a NIC driver, and/or other suitable network components of the gaming console.

Upon receiving the diagnostic command 164, the second client device 102b, i.e., the gaming console, can then execute one or more suitable diagnostic programs (not shown) to generate corresponding diagnostic information 166. The diagnostic information 166 can include data representing one or more of a current state/status of hardware/software components tested, test results of the hardware/software components, error codes related to the hardware/software components, and/or other suitable information. The second client device 102b can then transmit the diagnostic information 166 to the diagnostic system 150 via the computer network 104. In some embodiments, the collection engine 154 can also configure or program the second client device 102b (i.e., the gaming console) for additional diagnostic and/or other related information. For example, the collection engine 154 can be configured to program the gaming console to prompt the user 101 for additional diagnostic information, screen shots, or other suitable data when the user 101 subsequently accesses the gaming console. Upon receiving the diagnostic information 166, the collection engine 154 can forward both the feedback package 162 received from the first client device 102a and the diagnostic information 166 received from the second client device 102b to the record processor 156. Example modules of the collection engine 154 are described in more detail below with reference to FIG. 2.

In response to receiving both the feedback package 162 received from the first client device 102a and the diagnostic information 166 received from the second client device 102b, the record processor 156 can be configured to combine or "align" the feedback package 162 received from the first client device 102a and the diagnostic information 166 received from the second client device 102b into a diagnostic record 110. In certain embodiments, such combination can include inserting data representing information from the feedback package 162 and the diagnostic information 166 into different fields of a database record. One example database record schema is described in more detail below with reference to FIG. 3. In other embodiments, the combination can be implemented using other suitable data merging techniques.

Several embodiments of the disclosed technology can thus allow efficient submission of feedbacks from the first computing device 102a while allow remote diagnostic information collection from the second computing device 102b. Unlike other diagnostic systems, user feedback regarding issues of the second computing device 102b can be submitted using the first computing device 102a, which can be more efficient in providing the user feedback. Upon receiving the user feedback from the first computing device 102a, the diagnostic system 150 at the remote server 106 can trigger remote collection of diagnostic information 166 of the second computing device 102a. The collected diagnostic information 166 from the second computing device 102b can then be aggregated or combined with the received feedback from the first computing device 102a as a diagnostic record 110 for the reported issue of the second computing device 102b. As such, technical issues on the second computing device 102b can be readily submitted, diagnosed, and/or remedied even when the user 101 has no physical access to the second computing device 102b.

In some embodiments, the diagnostic system 150 can include the optional remedial controller 158 that is configured to analyze the description in the feedback package 162 in combination with the received diagnostic information 166 to determine a root cause of the reported issue with the second client device 102b (i.e., the gaming console) and automatically apply a remedial action to the gaming console. For example, as shown in FIG. 1E, the remedial controller 158 can be configured to analyze the feedback package 162 and diagnostic information 166 and determine that the operating system on the gaming console has crashed. In response, the remedial controller 158 can be configured to issue a remedial command (e.g., a reboot command) that causes the gaming console to restart. In another example, the remedial controller 158 can be configured to determine that the network interface card has failed on the gaming console. In response, the remedial controller 158 can be configured to provide a message to the user 101 on, for example, any of the first to fourth client devise 102a-102d, for replacement of the network interface card on the gaming console.

Figure 1D:
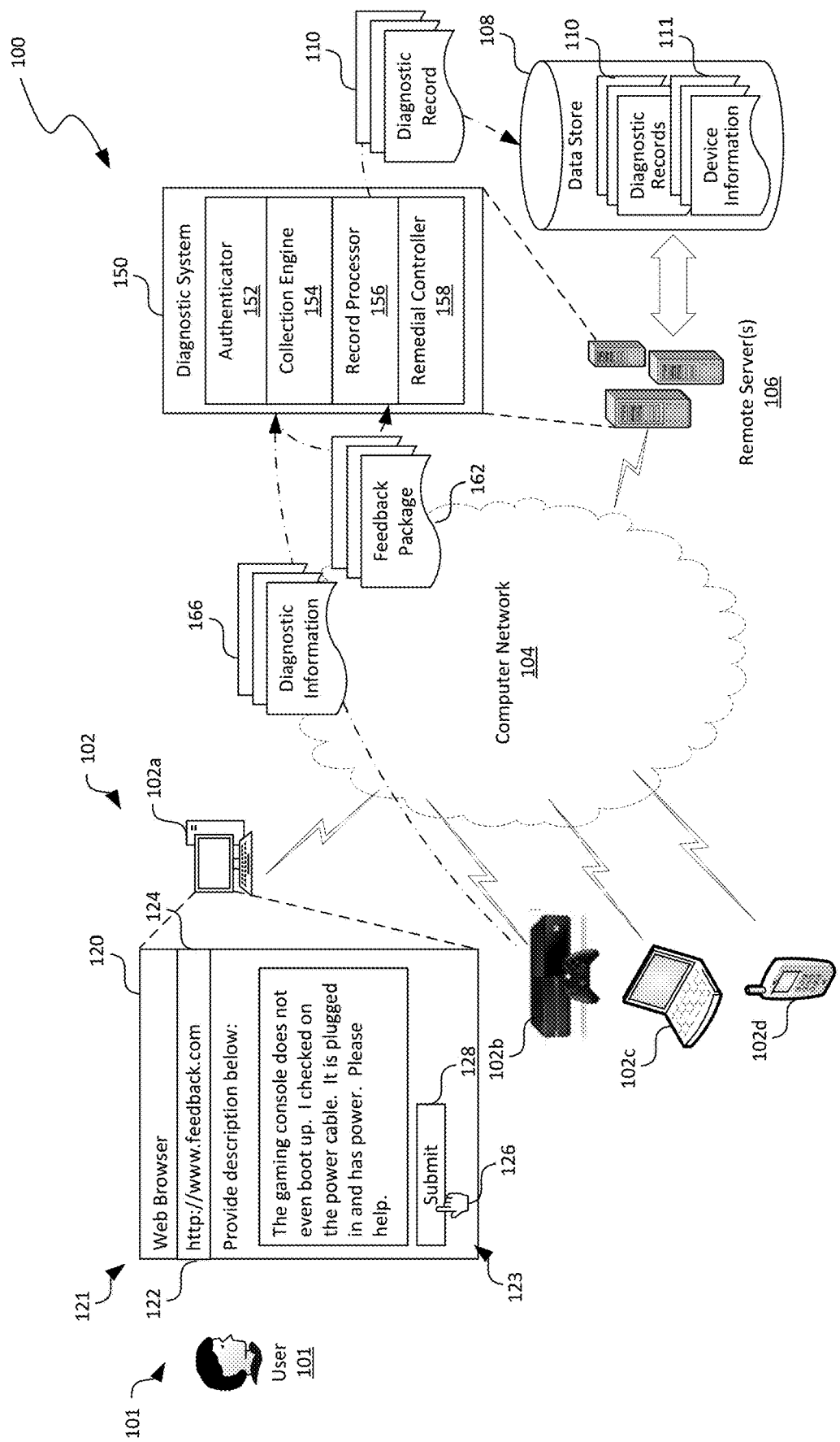
Figure 1E:
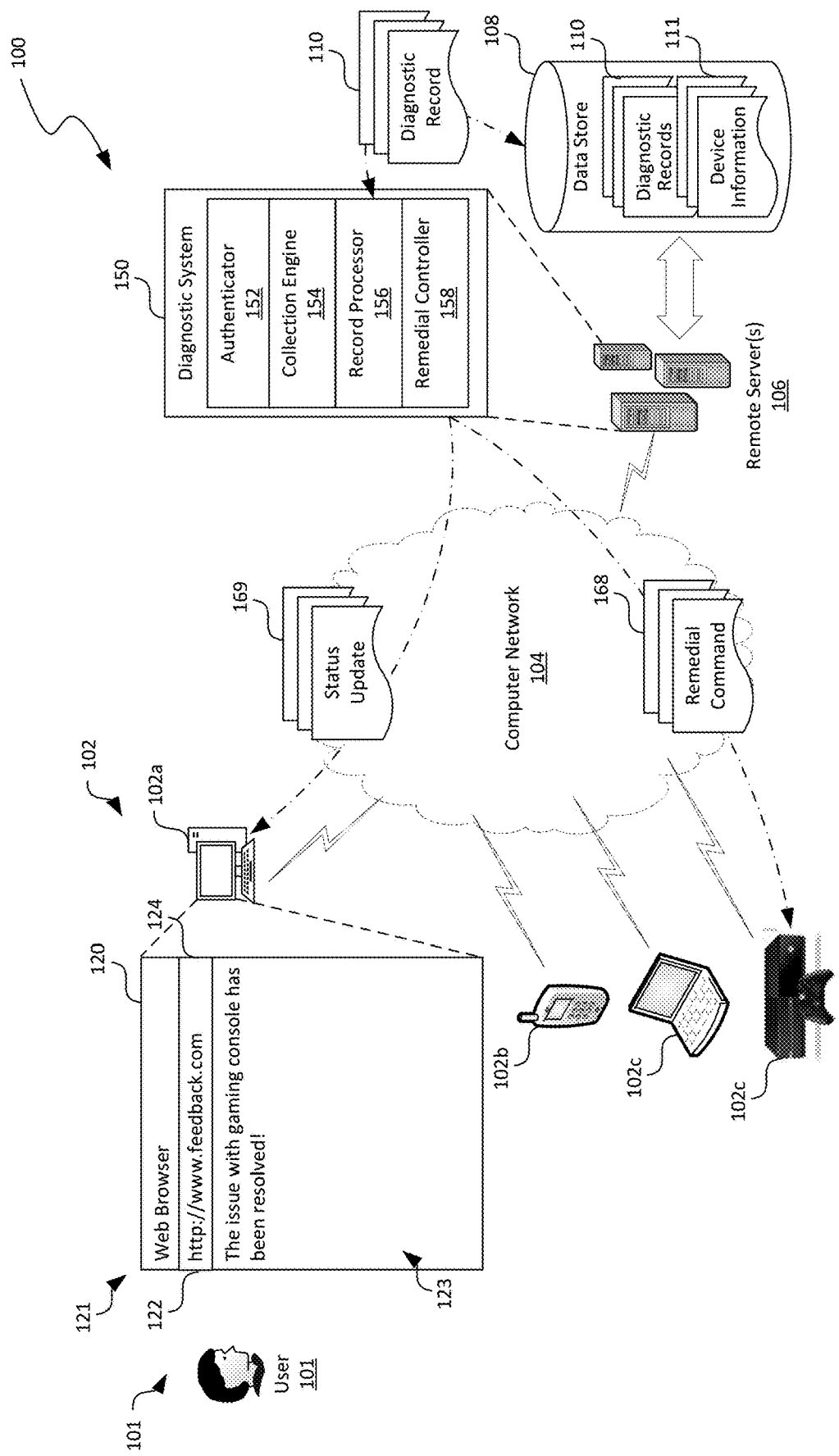
Figure 2:
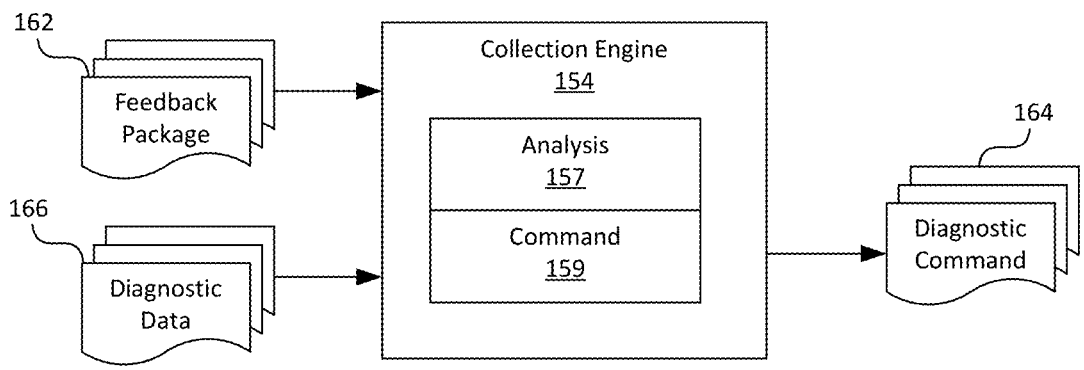
FIG. 2 is a schematic diagram illustrating certain hardware/software components of a collection engine suitable for the computing system of FIG. 1 in accordance with embodiments of the disclosed technology.

FIG. 2 is a schematic diagram illustrating certain hardware/software components of a collection engine 154 suitable for the computing system of FIG. 1 in accordance with embodiments of the disclosed technology. As shown in FIG. 2, the collection engine 154 can include an analysis module 157 and a command module 159 operatively coupled to each other. In other embodiments, the collection engine 154 can also include network, database, or other suitable types of modules.

In certain embodiments, the analysis module 157 can be configured to analyze the received feedback package 162 to determine one or more of (i) a client device 102 (FIG. 1A) to be test, (ii) an area of the client device 102 to be tested, (iii) one or more diagnostic programs to be executed by the client device 102. In one implementation, the analysis module 157 can be configured to perform the foregoing analysis based on machine learning. In other implementations, the analysis module 157 can be configured to perform the foregoing analysis based on rules (not shown) configured by, for instance, the user 101 (FIG. 1A), an administrator (not shown), or other suitable entities. In other embodiments, the analysis module 157 can be configured to analyze and determine other suitable parameters.

The command module 159 can be configured to determine one or more diagnostic command 164 corresponding to the determined one or more diagnostic programs to be executed by the client device 102. In certain implementations, the command module 159 can be configured to generate a batch command having multiple diagnostic commands 164 in sequence. In other embodiments, the command module 159 can be configured to generate multiple diagnostic commands 164 without a restriction of execution sequence. In further embodiments, the command module 159 can be configured to generate the diagnostic commands 164 by consulting an external source (e.g., a third party website), or via other suitable techniques.

Figure 3:
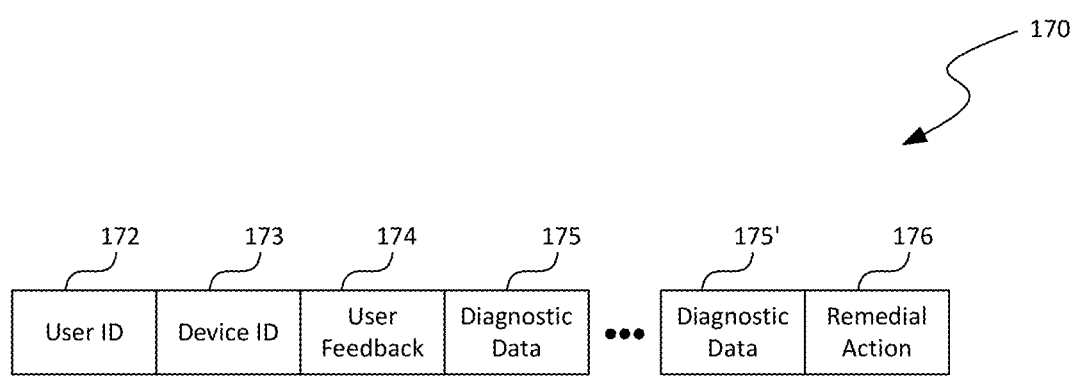
FIG. 3 is a schematic diagram illustrating an example schema for a diagnostic record in accordance with embodiments of the disclosed technology.

FIG. 3 is a schematic diagram illustrating an example schema 170 for a diagnostic record 110 of FIG. 1D in accordance with embodiments of the disclosed technology. As shown in FIG. 3, the example schema 170 can include multiple data fields. In the illustrated example, the schema 170 can include a user ID field 172, a device ID field 173, a user feedback field 174, one or more diagnostic data field 175, and a remedial action field 176. The user ID field 172 can be configured to contain data representing an identification of the user 101 (FIG. 1A). The device ID field 173 can be configured to contain data representing an identification of a selected client device 102 (FIG. 1A) that is to be tested. The user feedback field 174 can be configured to contain data representing any text, image, voice, or other suitable types of input from the user 101 related to operational issues of the client device 102. The diagnostic data field 175 can be configured to contain data representing the diagnostic information 166 (FIG. 1D) received from the client device 102. The remedial action field 176 can be configured to contain data representing one or more of a remedial action performed, a date/time the remedial action performed, and a result of performing the remedial action. In other examples, the schema 170 can also include additional and/or different fields (not shown).

Figure 4A:
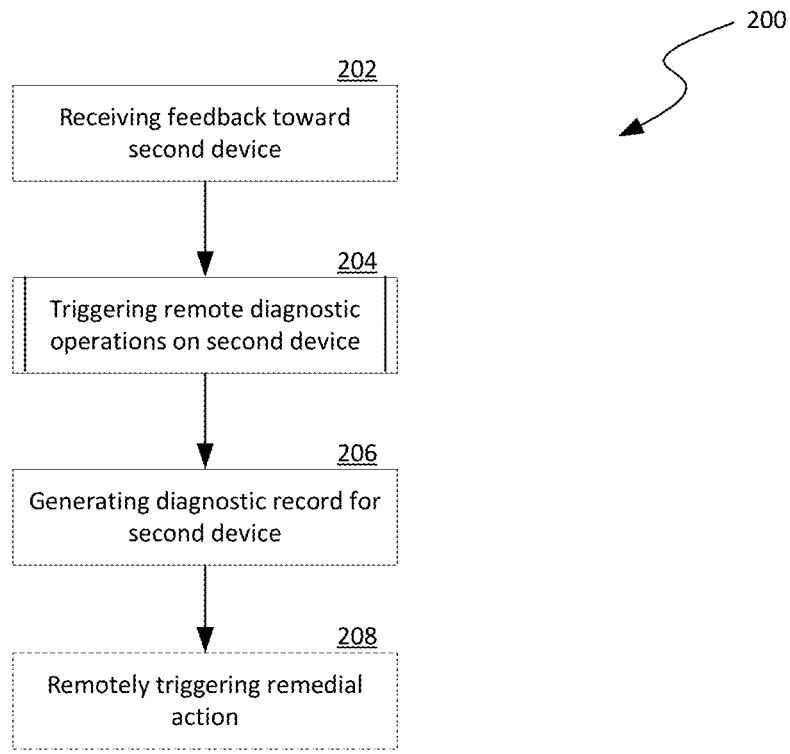
FIGS. 4A and 4B are flowcharts illustrating processes of remote diagnostic of computing devices in accordance with embodiments of the disclosed technology.
Figure 4B:
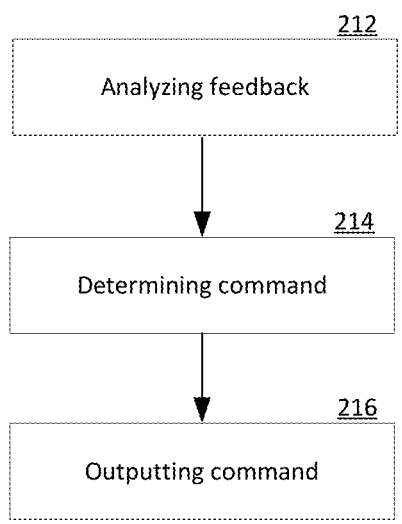
Figure 5:
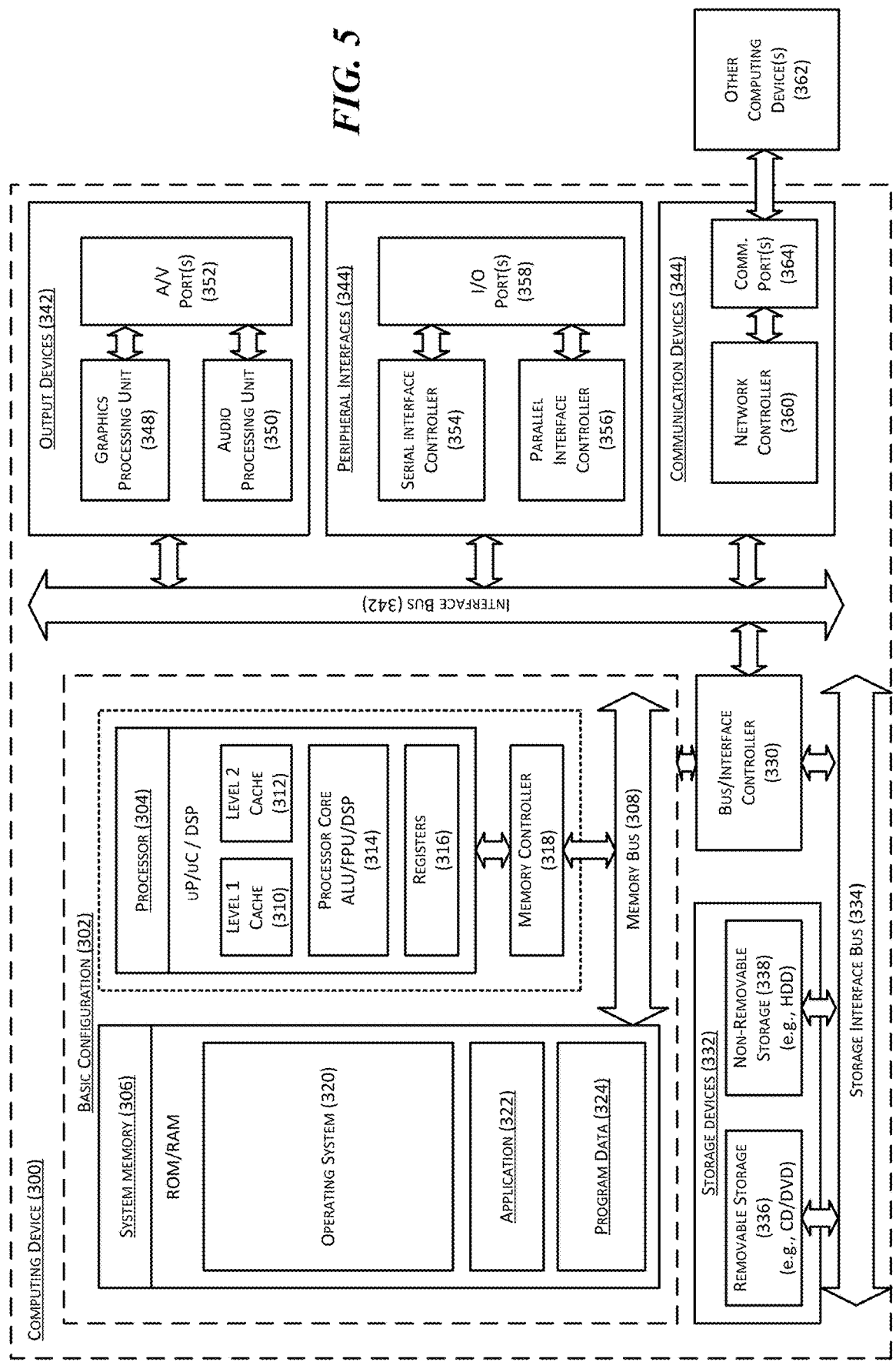
FIG. 5 is a computing device suitable for certain components of the distributed computing system in FIGS. 1A-1E.

FIGS. 4A and 4B are flowcharts illustrating processes of remote diagnostic of computing devices in accordance with embodiments of the disclosed technology. Even though operations of the processes are described in the context of the distributed computing system of FIGS. 1A-1E, in other embodiments, the processes can also be implemented in computing systems with additional and/or different components.

As shown in FIG. 4A, a process 200 can include receiving data from a first device, and the data representing a feedback of an operational issue toward a second device at stage 202. In one embodiment, such data can be received via a webpage, as described above with reference to FIGS. 1A and 1B. In other embodiments, such data can be received via other suitable communication channels. The process 200 can then include triggering remote diagnostic operations on the second device at stage 204. Example operations of triggering remote diagnostic operations are described below with reference to FIG. 4B. The process 200 can then include generating a diagnostic record for the second device at stage 206. Example operations of generating the diagnostic record are described above with reference to FIG. 1D. The process 200 can then include an optional operation of remotely triggering a remedial action on the second device at stage 208, as described above with reference to FIG. 1E.

As shown in FIG. 4B, triggering remote diagnostic operations can include analyzing the feedback at stage 212, and determining a command at stage 214, as described above with reference to FIG. 1C. The operations can then include outputting the determined command to, for example, the client device 102 in FIG. 1A, at stage 216.

FIG. 8 is a computing device 300 suitable for certain components of the distributed computing system 100 in FIGS. 1A-1E. For example, the computing device 300 can be suitable for the client devices 102 or the remote server 106 of FIGS. 1A-1E. In a very basic configuration 302, the computing device 300 can include one or more processors 304 and a system memory 306. A memory bus 308 can be used for communicating between processor 304 and system memory 306.

Depending on the desired configuration, the processor 304 can be of any type including but not limited to a microprocessor (µP), a microcontroller (µC), a digital signal processor (DSP), or any combination thereof. The processor 304 can include one more level of caching, such as a level-one cache 310 and a level-two cache 312, a processor core 314, and registers 316. An example processor core 314 can include an arithmetic logic unit (ALU), a floating-point unit (FPU), a digital signal processing core (DSP Core), or any combination thereof. An example memory controller 318 can also be used with processor 304, or in some implementations, memory controller 318 can be an internal part of processor 304.

Depending on the desired configuration, the system memory 306 can be of any type including but not limited to volatile memory (such as RAM), non-volatile memory (such as ROM, flash memory, etc.) or any combination thereof. The system memory 306 can include an operating system 320, one or more applications 322, and program data 324. This described basic configuration 302 is illustrated in FIG. 8 by those components within the inner dashed line.

The computing device 300 can have additional features or functionality, and additional interfaces to facilitate communications between basic configuration 302 and any other devices and interfaces. For example, a bus/interface controller 330 can be used to facilitate communications between the basic configuration 302 and one or more data storage devices 332 via a storage interface bus 334. The data storage devices 332 can be removable storage devices 336, non-removable storage devices 338, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data. The term "computer readable storage media" or "computer readable storage device" excludes propagated signals and communication media.

The system memory 306, removable storage devices 336, and non-removable storage devices 338 are examples of computer readable storage media. Computer readable storage media include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by computing device 300. Any such computer readable storage media can be a part of computing device 300. The term "computer readable storage medium" excludes propagated signals and communication media.

The computing device 300 can also include an interface bus 340 for facilitating communication from various interface devices (e.g., output devices 342, peripheral interfaces 344, and communication devices 346) to the basic configuration 302 via bus/interface controller 330. Example output devices 342 include a graphics processing unit 348 and an audio processing unit 350, which can be configured to communicate to various external devices such as a display or speakers via one or more A/V ports 352. Example peripheral interfaces 344 include a serial interface controller 354 or a parallel interface controller 356, which can be configured to communicate with external devices such as input devices (e.g., keyboard, mouse, pen, voice input device, touch input device, etc.) or other peripheral devices (e.g., printer, scanner, etc.) via one or more I/O ports 358. An example communication device 346 includes a network controller 360, which can be arranged to facilitate communications with one or more other computing devices 362 over a network communication link via one or more communication ports 364.

The network communication link can be one example of a communication media. Communication media can typically be embodied by computer readable instructions, data structures, program modules, or other data in a modulated data signal, such as a carrier wave or other transport mechanism, and can include any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), microwave, infrared (IR) and other wireless media. The term computer readable media as used herein can include both storage media and communication media.

The computing device 300 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 300 can also be implemented as a personal computer including both laptop computer and non-laptop computer configurations.

From the foregoing, it will be appreciated that specific embodiments of the disclosure have been described herein for purposes of illustration, but that various modifications may be made without deviating from the disclosure. In addition, many of the elements of one embodiment may be combined with other embodiments in addition to or in lieu of the elements of the other embodiments. Accordingly, the technology is not limited except as by the appended claims.

We claim:

1. A method of performing remote diagnostic in a computing system having a first computing device, a second computing device, and a remote server coupled to one another via a computer network, the method comprising:

transmitting, from the first computing device to the remote server, data representing user feedback reporting an operational issue related to the second computing device; and in response to receiving the data representing the operational issue related to the second computing device,
transmitting, from the remote server, a diagnostic command to the second computing device via the computer network;
executing, at the second computing device, the diagnostic command from the remote server to generate diagnostic information and transmitting the generated diagnostic information to the remote server; and
upon receiving the data representing the generated diagnostic information from the second computing device, at the remote server,
combining the data representing user feedback reporting the operational issue from the first computing device with the generated diagnostic information from the second computing device; and
storing, in a data store, the combined data as a database record corresponding to the reported operational issue of the second computing device from the first computing device.

2. The method of claim 1, further comprising:
in response to receiving the data representing user feedback reporting the operational issue related to the second computing device, at the remote server,
analyzing the received data representing user feedback reporting the operational issue to determine the one or more diagnostic operations to be performed on the second computing device; and
determining the diagnostic command corresponding to one or more diagnostic operations to be performed by the second computing device.

3. The method of claim 1 wherein:
receiving the data representing user feedback reporting the operational issue related to the second computing device includes, in addition to the data representing user feedback reporting the operational issue, receiving, from the first computing device, data representing a credential to access the second computing device remotely; and
transmitting the diagnostic command includes transmitting the diagnostic command along with the data representing the credential to the second computing device.

4. The method of claim 1, further comprising:
receiving, from the first computing device, data representing login information corresponding to a user account at the remote server;
in response to receiving the data representing the login information,
authenticating the received login information at the remote server;
upon authenticating the received login information, transmitting, from the remote server to the first computing device, data representing a list of computing devices registered to the user account, the list including both the first and second computing devices; and
receiving, from the first computing device, a selection of the second computing device and the data reporting the operational issue related to the second computing device.

5. A method of performing remote diagnostic in a computing system having a first computing device, a second computing device, and a remote server coupled to one another via a computer network, the method comprising:
receiving, at the remote server and from the first computing device, data representing user feedback reporting an operational issue related to the second computing device; and
in response to receiving the data representing the operational issue related to the second computing device,
transmitting, from the remote server, a diagnostic command to the second computing device, the diagnostic command triggering the second computing device to generate diagnostic information by performing one or more diagnostic operations;
receiving, at the remote server, data representing the generated diagnostic information from the second computing device; and
in response to receiving the data representing the generated diagnostic information from the second computing device,
combining the data representing the user feedback reporting the operational issue from the first computing device with the generated diagnostic information from the second computing device; and
storing, in a data store, the combined data as a database record corresponding to the reported operational issue of the second computing device from the first computing device.

6. The method of claim 5, further comprising:
in response to receiving the data representing user feedback reporting the operational issue related to the second computing device,
analyzing the received data representing user feedback reporting the operational issue to determine the one or more diagnostic operations to be performed on the second computing device; and
determining the diagnostic command corresponding to the one or more diagnostic operations.

7. The method of claim 5 wherein:
receiving the data representing user feedback reporting the operational issue related to the second computing device includes, in addition to the data representing user feedback reporting the operational issue, receiving, from the first computing device, data representing a credential to access the second computing device remotely; and
transmitting the diagnostic command includes transmitting the diagnostic command along with the data representing the credential to the second computing device.

8. The method of claim 5, further comprising:
in response to receiving the data representing the generated diagnostic information from the second computing device,
determining, at the remote server, a remedial action for the second computing device corresponding to the operational issue; and
transmitting, from the remote server, a remedial command to the second computing device, the remedial command triggering the determined remedial action on the second computing device, thereby addressing the operational issue reported from the first computing device.

9. The method of claim 5, further comprising:
in response to receiving the data representing the generated diagnostic information from the second computing device, determining, at the remote server, a remedial action for the second computing device corresponding to the operational issue based on the database record.

10. The method of claim 5, further comprising:
receiving, from the first computing device, data representing login information corresponding to a user account at the remote server; and
in response to receiving the data representing the login information,
   authenticating the received login information; and
   upon authenticating the received login information, transmitting, from the remote server to the first computing device, data representing a list of computing devices registered to the user account, the list including both the first and second computing devices.

11. The method of claim 5, further comprising:
receiving, from the first computing device, data representing login information corresponding to a user account at the remote server; and
in response to receiving the data representing the login information,
   authenticating the received login information;
   upon authenticating the received login information, transmitting, from the remote server to the first computing device, data representing a list of computing devices registered to the user account, the listing including both the first and second computing devices; and
   receiving, from the first computing device, a selection of the second computing device and the data reporting the operational issue related to the second computing device.

12. The method of claim 5, further comprising:
in response to receiving the data representing the generated diagnostic information from the second computing device,
   configuring, by the remote server, the second computing device to provide additional diagnostic information upon subsequent accessing the second computing device by a user; and
   upon receiving the additional diagnostic information from the second computing device, modifying the database record to include the received additional diagnostic information.

13. The method of claim 5, further comprising:
performing one or more of the following on the database record:
   removing personal identifiable information;
   censoring the received data reporting the operational issue;
   translating the received data reporting the operational issue from a first language to a second language;
   creating a bug report corresponding to the second computing device;
   preventing the database record to be queried by users; or
   forwarding a copy of the database record to an additional computing device for further processing.

14. A remote server in a computing system having a first computing device and a second computing device coupled to the remote server via a computer network, the remote server comprising:
a processor; and
a memory operatively coupled to the processor, the memory containing instructions executable by the processor to cause the remote server to:
   receive, from the first computing device, data representing user feedback reporting an operational issue related to the second computing device, and
   upon receiving, from the first computing device, the data representing the user feedback reporting an operational issue related to the second computing device,
      transmit, from the remote server and via the computer network, a diagnostic command to the second computing device, the diagnostic command triggering the second computing device to generate diagnostic information by performing one or more diagnostic operations; and
      upon receiving, from the second computing device, data representing the generated diagnostic information, combine the data representing the user feedback reporting the operational issue from the first computing device with the generated diagnostic information from the second computing device and store, in a data store, the combined data as a database record corresponding to the reported operational issue of the second computing device from the first computing device.

15. The remote server of claim 14 wherein the memory includes additional instructions executable by the processor to cause the remote server to:
upon receiving the data representing user feedback reporting the operational issue related to the second computing device,
   analyze the received data reporting the operational issue to determine the one or more diagnostic operations to be performed on the second computing device; and
   determine the diagnostic command corresponding to the one or more diagnostic operations.

16. The remote server of claim 14 wherein:
the received data from the first computing device also includes a credential to access the second computing device remotely; and
to transmit the diagnostic command includes to transmit the diagnostic command along with the data representing the credential to the second computing device.

17. The remote server of claim 14 wherein the memory includes additional instructions executable by the processor to cause the remote server to:
upon receiving the data representing the generated diagnostic information from the second computing device,
   determine a remedial action for the second computing device corresponding to the operational issue and transmit a remedial command to the second computing device, the remedial command triggering the determined remedial action on the second computing device, thereby addressing the operational issue reported from the first computing device.

18. The remote server of claim 14 wherein the memory includes additional instructions executable by the processor to cause the remote server to:
upon receiving the data representing the generated diagnostic information from the second computing device,
   determine, at the remote server, a remedial action for the second computing device corresponding to the operational issue based on the generated database record.

19. The remote server of claim 14 wherein the memory includes additional instructions executable by the processor to cause the remote server to:

receive, from the first computing device, data representing login information corresponding to a user account at the remote server; and in response to receiving the data representing the login information, authenticate the received login information; and upon authenticating the received login information, transmit, from the remote server to the first computing device, data representing a list of computing devices registered to the user account, the list including both the first and second computing devices.

20. The remote server of claim 14 wherein the memory includes additional instructions executable by the processor to cause the remote server to:

receive, from the first computing device, data representing login information corresponding to a user account at the remote server; and in response to receiving the data representing the login information, authenticate the received login information;

upon authenticating the received login information, transmit, from the remote server to the first computing device, data representing a list of computing devices registered to the user account, the listing including both the first and second computing devices; and receive, from the first computing device, a selection of the second computing device and the data reporting the operational issue related to the second computing device.

\* \* \* \* \*